United States Patent
Nakano et al.

(10) Patent No.: US 8,355,806 B2
(45) Date of Patent: Jan. 15, 2013

(54) INFORMATION CONTROL SYSTEM AND INFORMATION CONTROL METHOD

(75) Inventors: Toshihiko Nakano, Tokai (JP); Satoshi Ohkubo, Kasama (JP); Ryota Mibe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 12/646,998

(22) Filed: Dec. 24, 2009

(65) Prior Publication Data

US 2010/0168876 A1 Jul. 1, 2010

(30) Foreign Application Priority Data

Dec. 25, 2008 (JP) .................................. 2008-329055

(51) Int. Cl.
*G05B 13/02* (2006.01)
(52) U.S. Cl. .......................................................... 700/31
(58) Field of Classification Search ...................... 700/31
See application file for complete search history.

(56) References Cited

U.S. PATENT DOCUMENTS

| | | | | |
|---|---|---|---|---|
| 7,110,863 B2 * | 9/2006 | Tanaka et al. | ................. | 700/286 |
| 7,281,251 B2 * | 10/2007 | Otsuka et al. | ................. | 719/313 |
| 7,680,550 B2 * | 3/2010 | Weatherhead et al. | ......... | 700/27 |
| 7,779,362 B1 * | 8/2010 | Castrucci et al. | ............. | 715/765 |
| 2007/0019683 A1 * | 1/2007 | Kryzyanowski | .............. | 370/503 |
| 2009/0309721 A1 * | 12/2009 | Kitahara | ....................... | 340/540 |

FOREIGN PATENT DOCUMENTS

| | | |
|---|---|---|
| JP | 2003-223215 | 8/2003 |
| JP | 2005-149339 | 6/2005 |

OTHER PUBLICATIONS

Japanese Office Action, Japanese Patent Appln. No. 2008-329055, Mailing Date: Jul. 31, 2012.

* cited by examiner

*Primary Examiner* — Mohammad Ali
*Assistant Examiner* — Sivalingam Sivanesan
(74) *Attorney, Agent, or Firm* — Antonelli, Terry, Stout & Kraus, LLP.

(57) ABSTRACT

An information control system capable of precisely defining and executing a condition for stipulating a state of an apparatus to be controlled. A storage unit stores an object definition table storing data items of a structure and a state of an object constituting a controlled system, and an actor definition table storing a monitor condition of an object state, an object monitor item and a setting value, as an actor as a control element for monitoring and controlling the object. A processing unit receives an object state from the controlled system, and when the state changes, transmits changed state value to the actor. The actor then refers to the actor definition table to judge whether the monitor condition is satisfied, and if satisfied, changes the setting value of the monitor condition and transmits a control command for setting value change to the object corresponding to the monitor item.

6 Claims, 13 Drawing Sheets

NAME PART / CONTROL PART

| ACTOR TYPE | [STATE MONITOR FRAME WORK] |
|---|---|
| ACTOR NAME 1 | [ACCIDENT MONITOR FUNCTION] |
| ACTOR NAME 2 | [STANDARD] |
| MONITOR ITEM (OBJECT NAME) | [POWER SUPPLY INSTALLATION] |
| PRE-CONDITION | NONE |

EXECUTION PART

| RESULT | | |
|---|---|---|
| MONITOR ITEM | SETTING VALUE | CONDITION |
| [DRAWING PATTERN] | [BLINK] | [PRESENT] [OPERATION STATE] OF [POWER SUPPLY INSTALLATION] IS [ACCIDENT OCCURRENCE] |
| | [BLINK STOP] | OTHER THAN ABOVE |
| [ALARM] | [OUTPUT] | [PRESENT] [OPERATION STATE] OF [POWER SUPPLY INSTALLATION] IS [ACCIDENT OCCURRENCE] |
| | [STOP] | OTHER THAN ABOVE |
| [MAN-MACHINE BUTTON] | [FLICKER] | [PRESENT] [OPERATION STATE] OF [POWER SUPPLY INSTALLATION] IS [ACCIDENT OCCURRENCE] |
| | [FLICKER STOP] | OTHER THAN ABOVE |

FIG.4

| ACTOR TYPE | [STATE MONITOR FRAMEWORK] | } NAME PART |
| --- | --- | --- |
| ACTOR NAME 1 | [POWER SUPPLY INSTALLATION STATE] | |
| ACTOR NAME 2 | [STANDARD] | |
| MONITOR ITEM (OBJECT NAME) | [POWER SUPPLY INSTALLATION] | } CONTROL PART |
| PRE-CONDITION | [CHANGE STATE] OF [MONITOR OBJECT] [CHANGES] | |

| RESULT | | CONDITION | |
| --- | --- | --- | --- |
| MONITOR ITEM | SETTING VALUE | | |
| [OPERATION STATE] | [ACCIDENT OCCURRENCE] | [PRESENT] [OPERATION STATE] OF [BUSBAR] [BELONGING TO POWER SUPPLY INSTALLATION] IS [ACCIDENT OCCURRENCE] | |
| | | [PRESENT] [OPERATION STATE] OF [LINE] [BELONGING TO POWER SUPPLY INSTALLATION] IS [ACCIDENT OCCURRENCE] | |
| | | [PRESENT] [OPERATION STATE] OF [TRANSFORMER] [BELONGING TO POWER SUPPLY INSTALLATION] IS [ACCIDENT OCCURRENCE] | |
| | | [PRESENT] [OPERATION STATE] OF [DYNAMO] [BELONGING TO POWER SUPPLY INSTALLATION] IS [ACCIDENT OCCURRENCE] | |
| | [NORMAL] | OTHER THAN ABOVE | |

(EXECUTION PART)

FIG. 5A

| ACTOR TYPE | [STATE MONITOR FRAMEWORK] |
|---|---|
| ACTOR NAME 1 | [BUSBAR ACCIDENT STATE] |
| ACTOR NAME 2 | [STANDARD] |
| MONITOR ITEM (OBJECT NAME) | [BUSBAR] |
| PRE-CONDITION | [CHANGE STATE] OF [MONITOR OBJECT] [CHANGES] |

| RESULT | | |
|---|---|---|
| MONITOR ITEM | SETTING VALUE | CONDITION |
| [OPERATION STATE] | [ACCIDENT OCCURRENCE] | [PRESENT] [ACCIDENT MONITOR STATE] OF [BUSBAR] IS [WITH MONITOR] | [BREAKER STATE] OF [BUSBAR] IS [TRIP] |
| | [NORMAL] | OTHER THAN ABOVE |
| [ACCIDENT MONITOR STATE] | [WITH MONITOR] | [PREVIOUS] [RELAY STATE] OF [BUSBAR] IS [TRIP] | [PRESENT] [RELAY STATE] OF [BUSBAR] IS [TRIP] |
| | [WITHOUT MONITOR] | [ACCIDENT MONITOR STATE] OF [BUSBAR] IS [10-SECOND LAPSE] FROM [WITH MONITOR] |

FIG.5B

| ACTOR TYPE | [STATE MONITOR FRAMEWORK] |
|---|---|
| ACTOR NAME 1 | [BUSBAR OPERATION STATE] |
| ACTOR NAME 2 | [STANDARD] |
| MONITOR ITEM (OBJECT NAME) | [BUSBAR] |
| PRE-CONDITION | [CHANGE STATE OF MONITOR OBJECT] [CHANGES] |

| RESULT | | | |
|---|---|---|---|
| MONITOR ITEM | SETTING VALUE | CONDITION | |
| [RELAY STATE] | [TRIP] | [PREVIOUS] [STATE] OF [RELAY] BELONGING TO BUSBAR] IS [CONNECTION] | [PRESENT] [STATE] OF [RELAY] BELONGING TO BUSBAR] IS [DISCONNECTION] |
| | [NORMAL] | OTHER THAN ABOVE | |
| [BREAKER STATE] | [TRIP] | [PREVIOUS] [STATE] OF [BREAKER] BELONGING TO BUSBAR] IS [CONNECTION] | [PRESENT] [STATE] OF [BREAKER] BELONGING TO BUSBAR] IS [DISCONNECTION] |
| | [NORMAL] | OTHER THAN ABOVE | |

FIG.6A

| ACTOR TYPE | [STATE MONITOR FRAME WORK] |
|---|---|
| ACTOR NAME 1 | [RELAY STATE] |
| ACTOR NAME 2 | [STANDARD] |
| MONITOR ITEM (OBJECT NAME) | [RELAY] |
| PRE-CONDITION | [CHANGE STATE] OF [MONITOR OBJECT] [CHANGES] |

| RESULT | | CONDITION |
|---|---|---|
| MONITOR ITEM | SETTING VALUE | |
| [STATE] | [CONNECTION] | 0 |
| | [DISCONNECTION] | 1 |

FIG.6B

| ACTOR TYPE | [STATE MONITOR FRAME WORK] |
|---|---|
| ACTOR NAME 1 | [BREAKER STATE] |
| ACTOR NAME 2 | [STANDARD] |
| MONITOR ITEM (OBJECT NAME) | [BREAKER] |
| PRE-CONDITION | [CHANGE STATE] OF [MONITOR OBJECT] [CHANGES] |

| RESULT | | CONDITION |
|---|---|---|
| MONITOR ITEM | SETTING VALUE | |
| [STATE] | [CONNECTION] | 0 |
| | [DISCONNECTION] | 1 |

FIG.7A

FACILITIES STATE OBJECT (POWER SUPPLY INSTALLATION)

| COMMON PART | OBJECT NAME | POWER SUPPLY INSTALLATION | |
|---|---|---|---|
| | UPPER CLASS | — | |
| | CLASS DESIGNATION | CLASS | |
| DATA ITEM PART | DATA ITEM NAME | [DRAWING PATTERN] | [BLINK] |
| | | | [BLINK STOP] |
| | | [OPERATION STATE] | [ACCIDENT OCCURRENCE] |
| | | | [NORMAL] |
| | | ⋮ | |
| | DATA TYPE | INTEGER | |
| | STRUCTURE TYPE | SET | |
| | RANGE | 0~7 | |
| | INITIAL VALUE | 0 | |

FIG.7B

FACILITIES STRUCTURE OBJECT (POWER SUPPLY INSTALLATION)

| COMMON PART | OBJECT NAME | POWER SUPPLY INSTALLATION |
|---|---|---|
| | UPPER CLASS | — |
| | CLASS DESIGNATION | CLASS |
| DATA ITEM PART | DATA ITEM NAME | [BUSBAR][BELONGING TO POWER SUPPLY INSTALLATION] |
| | | [LINE][BELONGING TO POWER SUPPLY INSTALLATION] |
| | | [TRANSFORMER][BELONGING TO POWER SUPPLY INSTALLATION] |
| | | [DYNAMO][BELONGING TO POWER SUPPLY INSTALLATION] |
| | DATA TYPE | OBJECT NAME SET |
| | STRUCTURE TYPE | SET |
| | RANGE | NOT DEFINED |
| | INITIAL VALUE | NOT DEFINED |

FIG.8A

FACILITIES STATE OBJECT (BUSBAR)

| | | | |
|---|---|---|---|
| COMMON PART | OBJECT NAME | BUSBAR | |
| | UPPER CLASS | — | |
| | CLASS DESIGNATION | CLASS | |
| DATA ITEM PART | DATA ITEM NAME | [BUSBAR STATE] | [ACCIDENT OCCURRENCE] |
| | | | [NORMAL] |
| | | [ACCIDENT MONITOR STATE] | [WITH MONITOR] |
| | | | [WITHOUT MONITOR] |
| | | [RELAY STATE] | [TRIP] |
| | | | [NORMAL] |
| | | [BREAKER STATE] | [TRIP] |
| | | | [NORMAL] |
| | DATA TYPE | INTEGER | |
| | STRUCTURE TYPE | SET | |
| | RANGE | 0~4 | |
| | INITIAL VALUE | 0 | |

FIG.8B

FACILITIES STRUCTURE OBJECT (BUSBAR)

| | | |
|---|---|---|
| COMMON PART | OBJECT NAME | BUSBAR |
| | UPPER CLASS | — |
| | CLASS DESIGNATION | CLASS |
| DATA ITEM PART | DATA ITEM NAME | [RELAY][BELONGING TO BUSBAR] |
| | | [BREAKER][BELONGING TO BUSBAR] |
| | DATA TYPE | OBJECT NAME SET |
| | STRUCTURE TYPE | SET |
| | RANGE | NOT DEFINED |
| | INITIAL VALUE | NOT DEFINED |

INFORMATION CONTROL SYSTEM AND INFORMATION CONTROL METHOD

BACKGROUND OF THE INVENTION

The present invention relates to an information control system and an information control method capable of precisely defining and executing a condition which prescripts a state of an apparatus to be controlled.

As a program development model for an information control system, a waterfall model is known. The waterfall model divides a whole project into a plurality of processes, results (documents such as specifications and design plans) at each process are precisely defined, works at later processes are sequentially performed in accordance with the results obtained at preceding processes. The waterfall model can be said as document driven type development processes aiming to apply the principle of "definitions by specifications".

For example, "system specifications" are exchanged between an ordering party and a receiving party when ordering and receiving an information control system such as a power system, a train running management system and a sewage/water management system. The system specifications are documents for stipulating the state of apparatus (facilities) constituting a system. The system specifications are important interface documents among an ordering party, a receiving party, a designer and an implementer (coder). The system specifications include various explanations regarding the state of an apparatus written by a text such as a Japanese language text.

An executable program processing method is disclosed in which a reserved word file providing a correspondence between syntax rules and execution rules for each reserved word is defined, and a script using reserved words is used for a business transaction definition file (for example, refer to JP-A-2005-149339).

SUMMARY OF THE INVENTION

According to the techniques of JP-A-2005-149339, although the business transaction definition is written by a simple script, there remains a problem that the contents of system specifications of business transactions are required to be written by a script.

In some cases, system specifications contain fundamentally ambiguous texts or miss some texts. For example, one sentence of a Japanese text may have a plurality of interpretations. For example, a Japanese text of system specifications writes often "if a state is not a state of XX, it is assumed to be ZZ".

However, a designer and an implementer are impossible to make a control program if a condition that a "state of XX" is not satisfied is not written precisely. Therefore, the system specifications preferably write the unsatisfying condition. However, the system specifications write often only an explanation of the satisfying condition of the "state of XX" in a Japanese text, and do not write an explanation of the unsatisfying condition of the "state of XX". In this context, an explanation of the system specifications becomes ambiguous.

The satisfying condition and unsatisfying condition for each condition for stipulating the state of an apparatus are often unclear. Proficiency is required to describe all conditions in Japanese language without missing any condition. For example, system specifications write often "if a state is a state of XX, it is assumed to be YY" in a Japanese text. If the "state of XX" is satisfied by only one condition, the condition is defined uniquely. This text is therefore precise. However, if the "state of XX" is satisfied by a plurality of conditions, the satisfying condition and unsatisfying condition are often indefinite.

As described above, conventionally used system specifications contain ambiguous explanations or miss some texts. Even if the conventionally used system specifications contain ambiguous explanation, it falls in some cases into an error that this explanation text is understood clearly by a reader because of existence of this text.

The conventionally used system specifications are therefore associated with a problem that a reader is induced to have ambiguous understanding. Further, for example, when an ordering party and a receiving party confirm the specifications or analyze requirements, there arises a problem of missing specification texts and difficulty in judging adequacy of description.

Furthermore, for example, when a designer and an implementer write a control program, there arises a problem that it is difficult to check the satisfying condition and unsatisfying condition for each condition of each specification. Further, there is a problem that apparatus (facilities) cannot operate properly in some cases even if the system specifications are followed.

The present invention solves the above-described problems, and an object of the present invention is to provide an information control system and an information control method capable of precisely defining and executing a condition for stipulating the state of an apparatus to be controlled.

In order to achieve the abode-described object, the information control system introduces a concept of an object constituting a system to be controlled and an actor for monitoring a state of each object and issuing a state change command to the object.

In the information control system, a storage unit stores actor definition information storing an object name of an object, a monitor item of the object, a setting value of the monitor item and a monitor condition of the setting value, as an actor serving as a control element for monitoring and controlling the object; and a processing unit receives a state value representative of the state of the object from a controlled system, and when the state of the object changes, transmits the changed state value to the actor monitoring the state of the object; and the actor received the state value refers to the actor definition information to judge whether the monitor condition is satisfied, and if the monitor condition is satisfied, changes the setting value of the monitor item, and transmits a control command for the changed setting value to the object corresponding to the monitor item to change the state of the object in accordance with the transmitted control command.

According to the present invention, it is possible to precisely define and execute a condition for stipulating the state of an apparatus to be controlled.

Other objects, features and advantages of the invention will become apparent from the following description of the embodiments of the invention taken in conjunction with the accompanying drawings.

DETAILED DESCRIPTION OF THE EMBODIMENTS

Detailed description will now be made on an embodiment of the present invention with reference to the accompanying drawings. In each figure, common or similar constituent elements are represented by identical reference symbols, and duplicated description of these elements is omitted.

An information control system of the embodiment does not pertain to a method of writing a program by making a program developer read and analyze conventional ambiguous system specifications. Namely, a program-less development approach based on a system definition document is adopted without writing and executing a program in accordance with system specifications. Modeling of a system to be controlled is therefore important.

In modeling a system to be controlled, it becomes necessary to provide modeling of an "operator work" and "criterion, operation sequence" to be used in works, and those items necessary for running (controlling) such as "facilities values" and "running plans". The former modeling and the latter items are called hereinafter "actor" and "object", respectively. The details will be given later.

Figure 1:
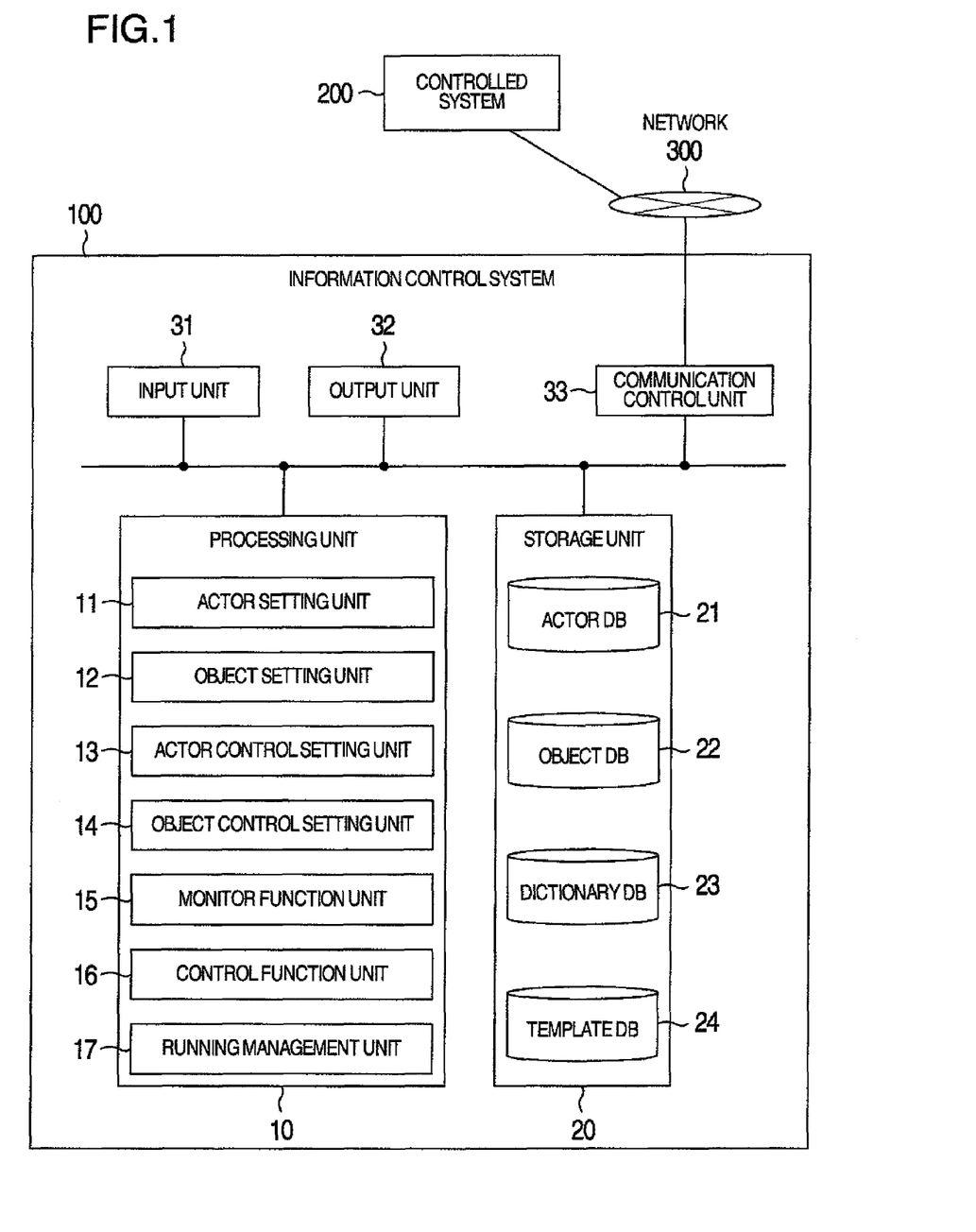
FIG. 1 is a block diagram illustrating the configuration of an information control system according to an embodiment.

FIG. 1 is a block diagram illustrating the configuration of an information control system of the embodiment. The information control system 100 is constituted of a processing unit 10 for information control, a storage unit 20 for storing data for information control, an input unit 31 for data input, an output unit 32 for data output, and a communication control unit 33 for communicating via a network 300 with a system 200 to be controlled.

The storage unit 20 is constituted of a random access memory (RAM), a hard disk drive (HDD) and the like. The processing unit 10 has one or more central processing units (CPUs) and executes programs in RAM and HDD. The input unit 31 is a keyboard, a mouse and the like, and inputs an instruction such as program activation to the system. The output unit 32 is a display or the like, and displays an execution state, execution results and the like of the information control system 100. The communication control unit 33 exchanges various data and commands via the network 300 with the system 200 to be controlled. The controlled system 200 may be a power system, a train running management system or a sewage/water management system.

The processing unit 10 includes an actor setting unit 11, an object setting unit 12, an actor control setting unit 13, an object control setting unit 14, a monitor function unit 15 for monitoring a state change of each object of the controlled system, a control function unit 16 for supplying an object with a control command in accordance with a control command of the monitor function unit 15, and a running management function unit 17 for running management of the controlled system 200.

The storage unit 20 stores an actor DB 21 for storing actor information (actor definition table, actor definition information), an object DB 22 for storing object information (object definition table, object definition information), a dictionary DB 23 in which terms used by the actors and objects are defined, and a template DB 24 for storing templates (definition tables) to be used for setting actors and objects. The actor definition tables will be described later with reference to FIGS. 3 to 6B. The object definition tables will be described later with reference to FIGS. 7A to 8B.

The monitor function unit 15 has a function of searching a definition word (to be described later) from the definition tables in the actor DB 21 and object DB 22, and, in particular, the search function searches related words upon operation of the actors. The search function may search a definition word itself, or may assign an ID to each definition word to search by using ID.

Figure 2:
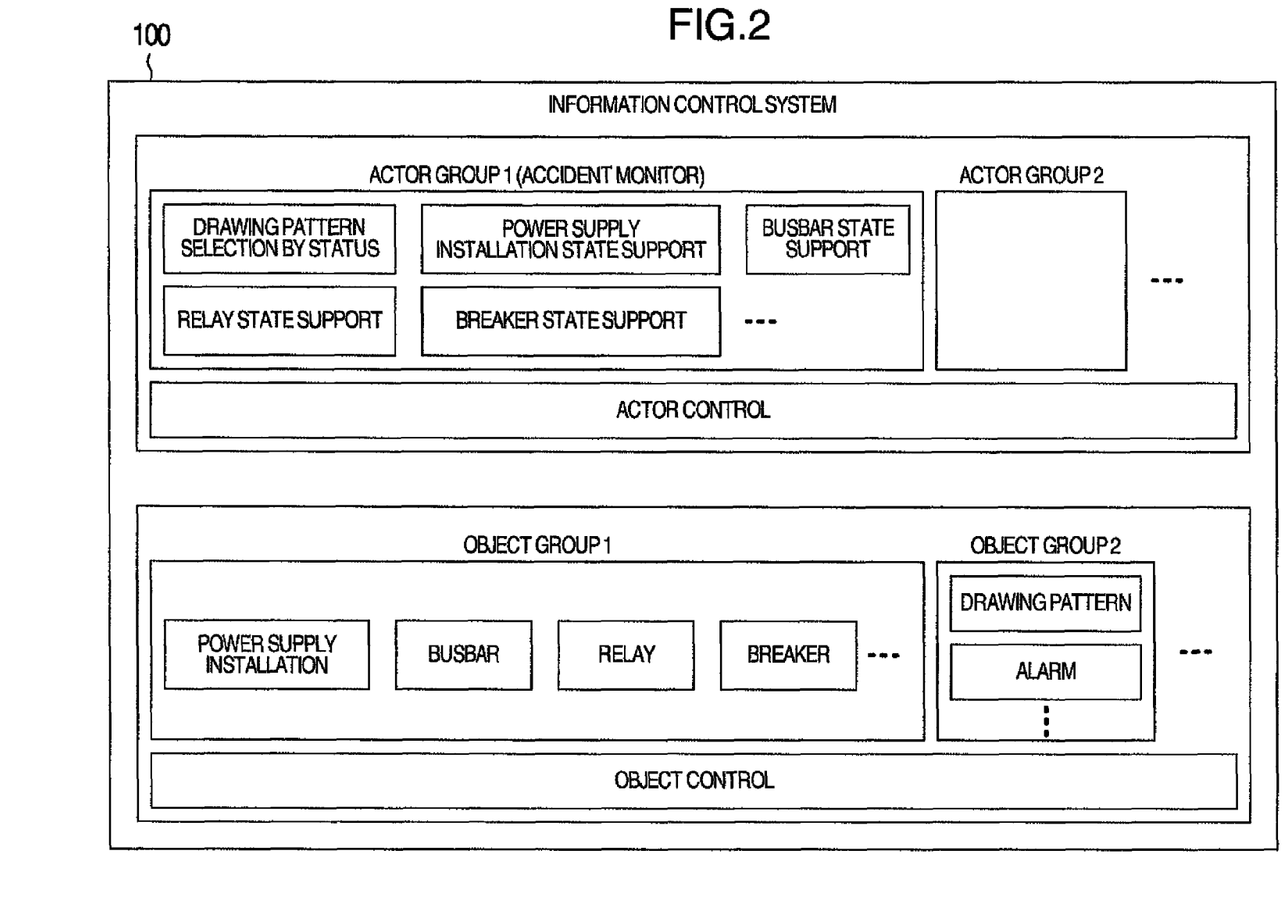
FIG. 2 is an explanatory diagram illustrating the relation between an actor and an object.

With reference to FIG. 2, description will be made on the contents of the actor and object, the actor setting unit 11, object setting unit 12, actor control unit 13 and object control unit 14.

FIG. 2 is an explanatory diagram illustrating the relation between an actor and an object. The embodiment will be described by using, as an example, accident monitor of a power supply installation of a power system. The power supply installation is a power station, a power substation and the like. Objects are those items necessary for works (control). Objects of the power supply installation include the power supply installation, busbars, relays, breakers and the like constituting the power supply installation. A drawing pattern on a monitor screen and an alarm for monitor can be said also as objects. Actors include operator works or control functions such as an operation instruction function, a screen monitor function and a state change support. Actors illustrated in FIG. 2 include a drawing pattern selection by status, a power supply installation state support, a bulbar state support, a relay state support, a breaker state support and the like. Namely, functions necessary for the controlled system are defined as the actors, and data utilized by actors are defined as the objects.

Reverting to FIG. 1, the actor setting unit 11 stores an actor definition table set and defined in accordance with the actor definition table in the template DB 24, in the actor DB 21. Similarly, the object setting unit 12 stores an object definition table set and defined in accordance with the object definition table in the template DB 24, in the object DB 22.

The actor control setting unit 13 sets the operations of the whole actors. An actor execution order, an object data fetching timing and the like are set, by setting an actor group of a plurality of actors for each function of the controlled system. The actor control setting unit 13 sets a plurality of actor groups.

The object control setting unit 14 sets the operations of the whole objects. Data reflection control among the same objects over CPUs and the like are set, by setting an object group of a plurality of objects for each function of the controlled system. The object control setting unit 14 sets a plurality of object groups.

The set actor groups and object groups are executed in the information control system 100 in accordance with rules stipulated for actor control and object control, respectively.

The information control system 100 is controlled by actors and objects. The characteristic features and a specific control method will be described hereinafter.

(1) Execution of Separation Between Model Logics and Implementation Cooperation

A portion whose operation relies upon specifications defined on the basis of a model is separated from a portion whose operation requires cooperation with a peripheral.

Interface between model logics and implementation cooperation is realized only via data. Namely, a procedure and the like regarding implementation cooperation are shielded by an object.

(2) Securement of Function Independency

A unit of a self-running operation is used as a unit of an actor corresponding to one implementation unit. The self-running operation means that the operation can be executed independently in this unit and operates "if the condition is satisfied".

An actor operates when the condition of allowing the actor to operate is satisfied.

An actor does not implement synchronous execution with another actor while the actor is executed. Namely, an actor does not incorporate logics of asking another actor about execution and waiting for a response from the other actor.

Execution is realized by verifying whether all actors can be executed periodically and sequentially executing executable actors.

(3) Separation Between Logics and Data

Data and a state for a next operation are not contained in a self-running operation unit. Self-running operations themselves and values and states necessary for continuation of self-running operations are realized by another implementation for managing values and states.

(4) Securement of Data Unit Independency

Data is stipulated by an object. Therefore, an object cooperating with an external updates the data of the external in accordance with the actor and in response to data update from the external.

For data update of an object cooperating with an external, data is fetched before an execution period of the actor and reflected after execution. A function group for realizing this data update is stipulated in the object.

An operation model of an actor and an objet satisfying the above-described characteristic features is stipulated. Namely, (1) Before execution on the basis of actor control, real data is reflected upon data of an object.

The function group stipulated in the object to be executed upon reference is executed.

(2) Actors are sequentially activated in accordance with an actor execution order stipulated by actor control. Specifically, (2-1) An actor judges whether the condition to be executed is satisfied.

(2-2) An actor satisfying the condition executes in accordance with described specifications. More specifically, necessary data is referred to from the object to set data to the object in accordance with decided rules.

(2-3) When all actors are executed completely, a changed value of the object is reflected upon the real data. A function group stipulated in the object is executed upon renewal.

Next, a specific actor definition table and a specific object definition table will be described.

FIGS. 3 to 6B illustrate actor definition tables, and FIGS. 7A to 8B illustrate object definition tables. In this embodiment, description will be made on objects and the actors for defining an accident monitor function of the power supply installation.

Figure 3:
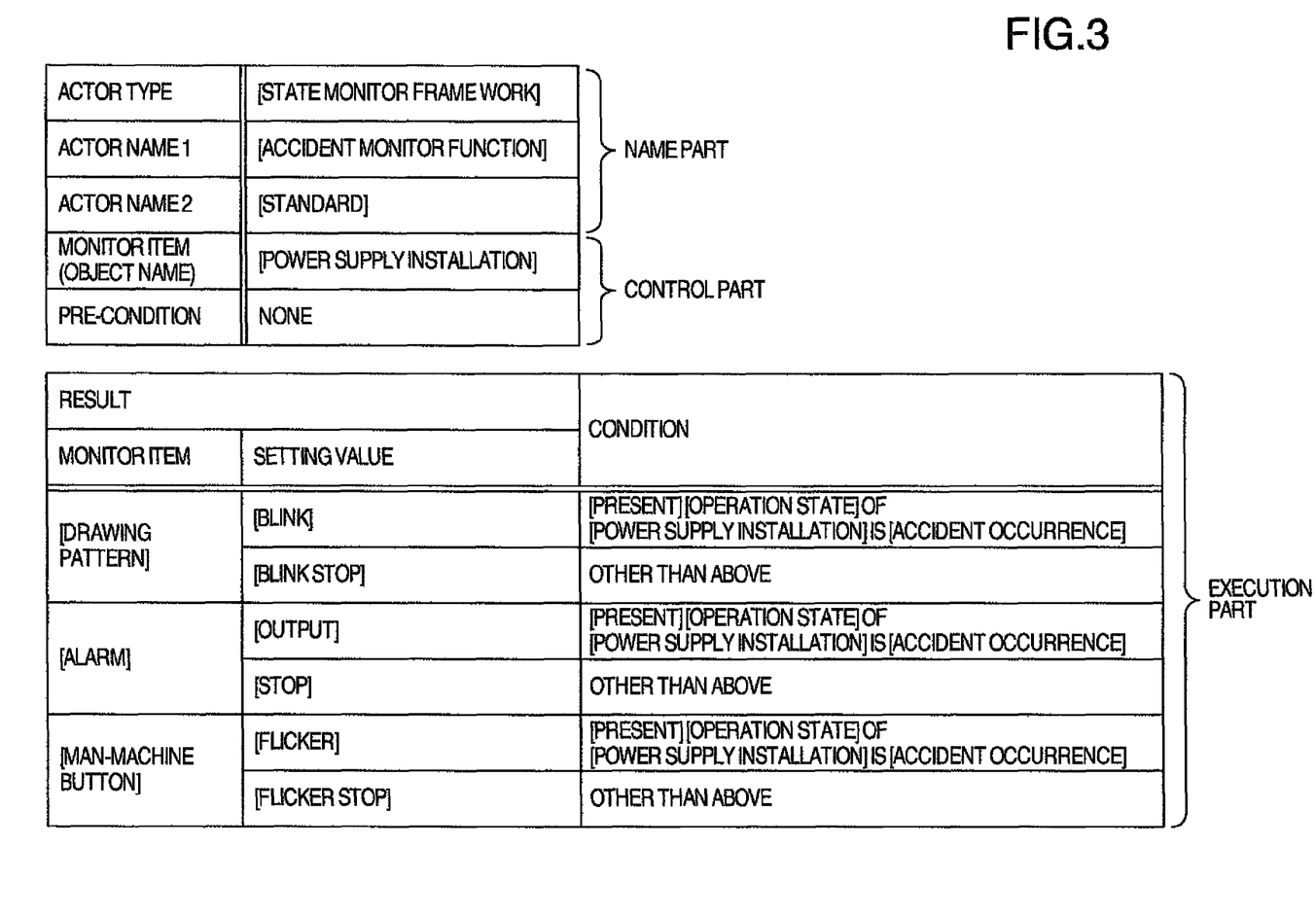
FIG. 3 is a diagram illustrating the structure of an accident monitor function in an actor definition table.

FIG. 3 is a diagram illustrating the structure of an accident monitor function of the actor definition table. The actor definition table is constituted of a name part, a control part and an execution part. The name part is constituted of names for identifying the actor, and includes an actor type, an actor name 1 and an actor name 2. The control part defines a monitor item (object name) for which the actor operates, and a pre-condition. If this condition is satisfied, conditions described in the execution part become valid.

The execution part (actor execution part) is constituted of a result including a monitor item and a setting value, and a condition for obtaining the result. This condition is representative of knowhow of an operator to be reflected upon the controlled system and a constraint condition regarding running (control). The execution part defines a conditional expression in a table format for each of a plurality of monitor items. More specifically, if a condition that [present] [operation state] of [power supply installation] is [accident occurrence] is satisfied, then the processing unit 10 instructs to enable [blink] of [drawing pattern] of the monitor item. In the case other than this (If a condition that [present] [operation state] of [power supply installation] is [accident occurrence] is not satisfied), then the processing unit 10 instructs to enable [blink stop] of [drawing pattern] of the monitor item. Further, in the example illustrated in FIG. 3, if a condition that [present] [operation state] of [power supply installation] is [accident occurrence] is satisfied, then [blink] of [drawing pattern] of the monitor item is enabled, [output] of [alarm] is enabled, and [flicker] of [man-machine button] item is enabled.

Each term surrounded by "[" and "]" in the execution part of the table format indicates a definition word of the information control system 100. Each term surrounded by "[" and "]" is called hereinafter "definition word". This definition word has the same meaning in all actors. This definition word is used for indicating a reference to actors.

Further, as illustrated in FIG. 3, it is necessary for the information control system to consider a time factor so that a definition word such as "present" is used in the conditional expression. It is assumed that the time factor is already defined in another actor, and the description thereof is omitted.

Figure 4:
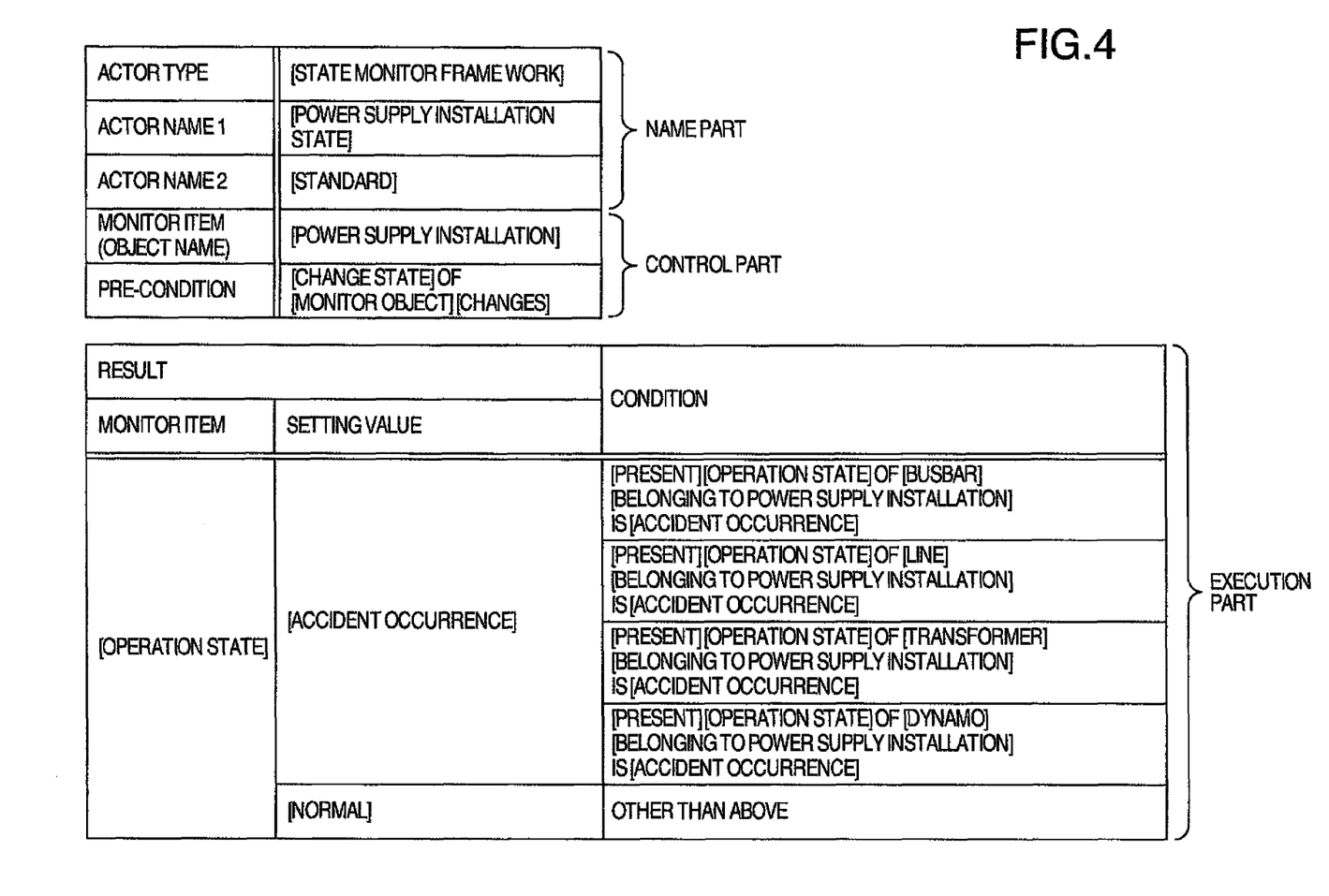
FIG. 4 is a diagram illustrating the structure of a power supply installation state in an actor definition table.

FIG. 4 is a diagram illustrating the structure of a power supply installation in the actor definition table. The actor definition table illustrated in FIG. 4 is similar to that illustrated in FIG. 3, and the description thereof is omitted. A different point is that a plurality of conditions are defined by an OR operation. More specifically, if [power supply installation] of the monitor item (object name) satisfies a predetermined operation condition, then [accident occurrence] in [operation state] is enabled. The predetermined operation condition is a condition of satisfying a condition that [present] [operation state] of [busbar] [belonging to power supply installation] is [accident occurrence], a condition that [present] [operation state] of [line] [belonging to power supply installation] is [accident occurrence], a condition that [present] [operation state] of [transformer] [belonging to power supply installation] is [accident occurrence], or a condition that [present] [operation state] of [dynamo] [belonging to power supply installation] is [accident occurrence]. Each monitor object (e.g., [bus bar] [belonging to power supply installation]) has a reference to an object definition table (installation structure object) illustrated in FIG. 7B.

Figure 5A:
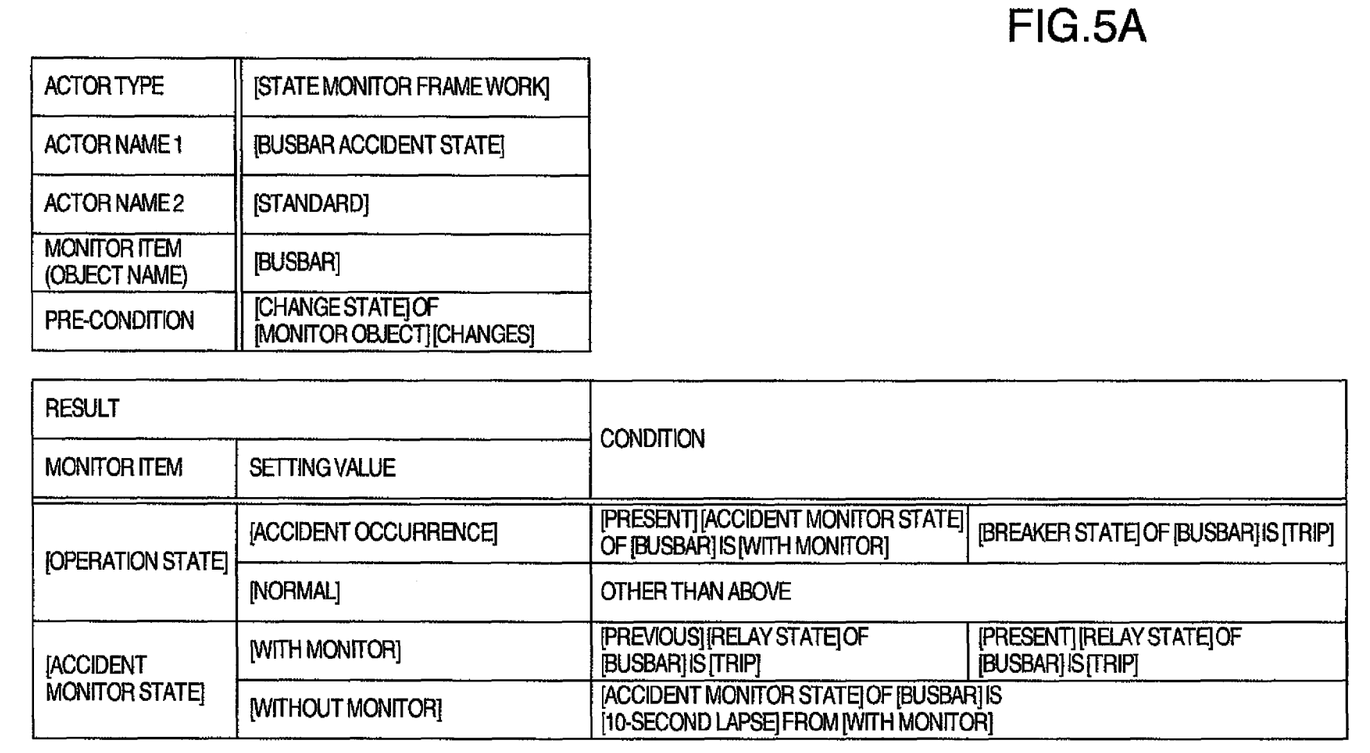
FIGS. 5A and 5B are diagrams illustrating the structures of a busbar accident state and a busbar operation state in actor definition tables.
Figure 5B:
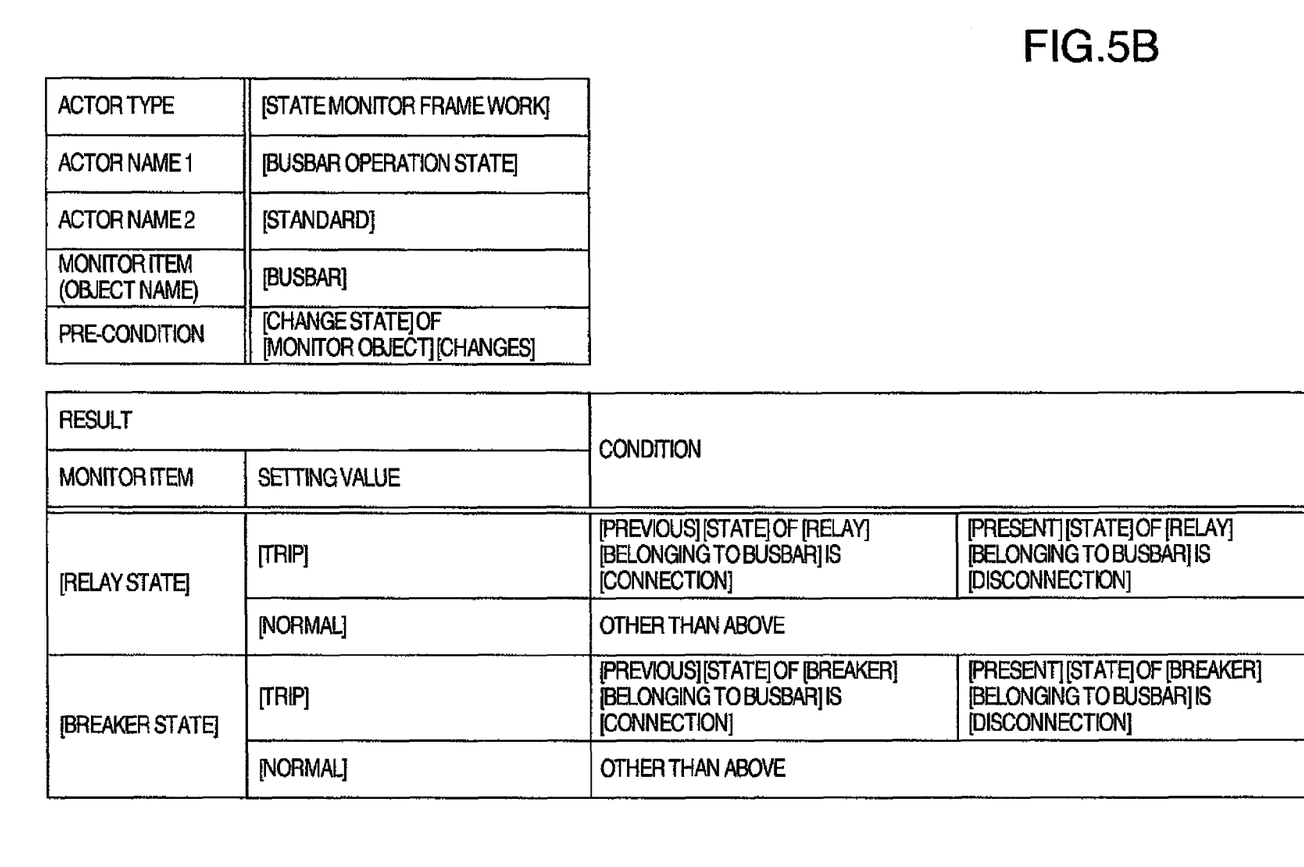

FIGS. 5A and 5B are diagrams illustrating the structures of a busbar accident state and a busbar operation state in actor definition tables. The actor definition table illustrated in FIG. 5A is similar to that illustrated in FIG. 3, and the description thereof is omitted. A different point is that a plurality of conditions are defined by an AND operation in the execution part. More specifically, as illustrated in FIG. 5A, if [busbar] of the monitor item (object name) satisfies a condition that [present] [accident monitor state] of [busbar] is [with monitor] and a condition that [breaker state] of [busbar] is [trip], then [accident occurrence] in [operation state] is enabled. Similarly, if [busbar] of the monitor item (object name) satisfies a condition that [previous] [relay state] of [busbar] is [trip] and a condition that [present] [relay state] of [busbar] is [trip], then [with monitor] in [accident monitor state] is enabled.

As specifically illustrated in FIG. 5B, if [bus bar] of the monitor item (object name) satisfies a condition that [previous] [state] of [relay] [belonging to busbar] is [connection] and a condition that [present] [state] of [relay] [belonging to busbar] is [disconnection], then [trip] of [relay state] is enabled.

Figure 6A:
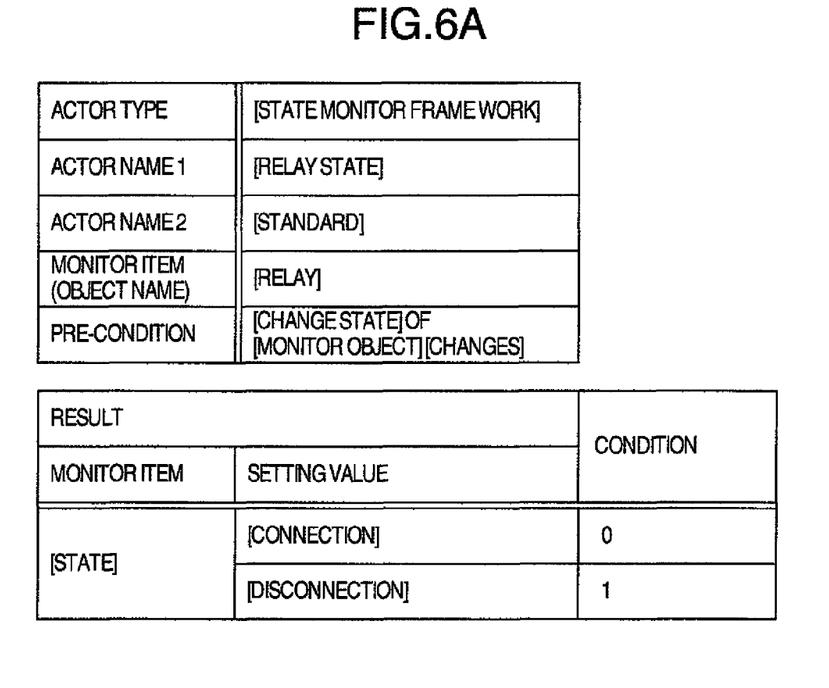
FIGS. 6A and 6B are diagrams illustrating the structures of a relay state and a breaker state in actor definition tables.
Figure 6B:
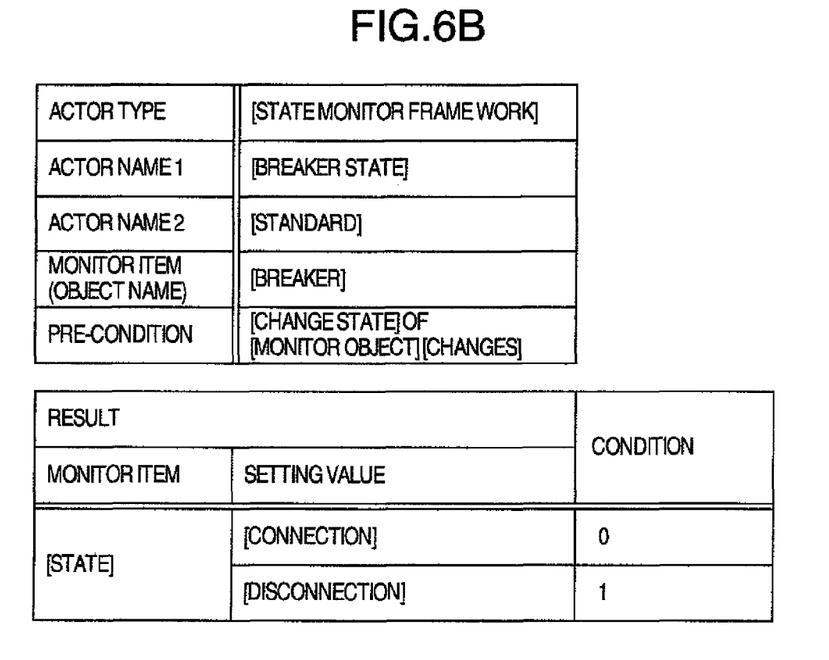

FIGS. 6A and 6B are diagrams illustrating the structures of a relay state and a breaker state in actor definition tables. The definition tables illustrated in FIGS. 6A and 6B indicate a reference between a signal bit of each object in the controlled system and a setting value of the monitor item. As specifically illustrated in FIG. 6A, under a condition of "0" of [relay] of the monitor item (object name), [connection] of [state] is enabled, whereas under a condition of "1", [disconnection] of [state] is enabled. Similarly, as illustrated in FIG. 6B, under a condition of "0" of [breaker] of the monitor item (object name), [connection] of [state] is enabled, whereas under a condition of "1", [disconnection] of [state] is enabled. The monitor function unit 14 receives the control signal from the controlled system via the communication control unit 33.

Figure 7A:
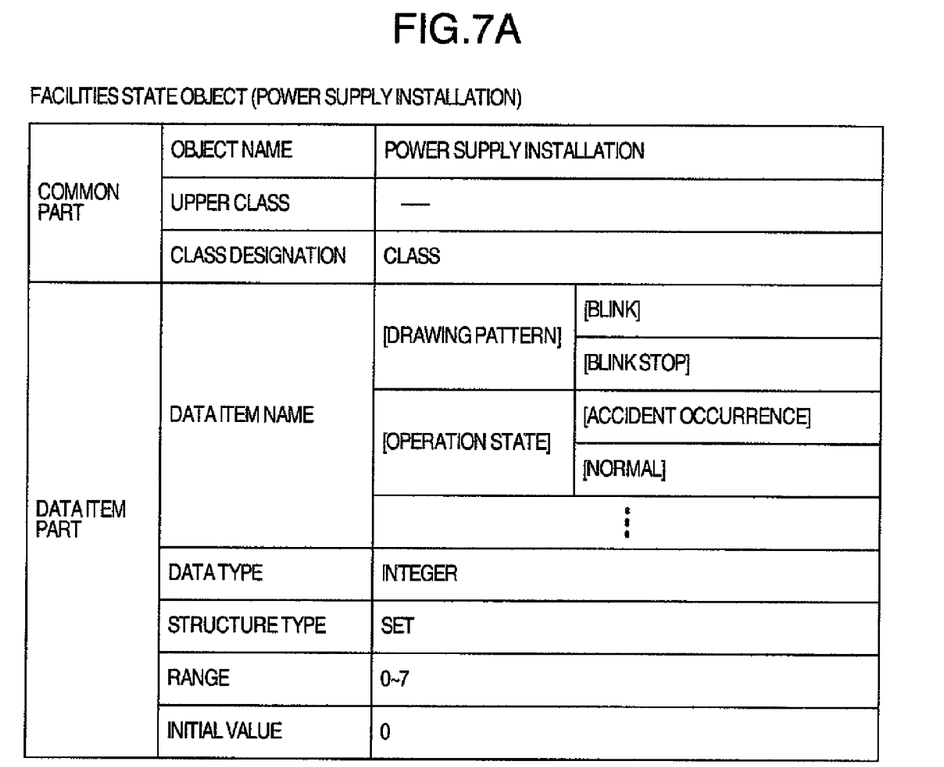
FIGS. 7A and 7B are diagrams illustrating the structures of a power supply installation in object definition tables.
Figure 7B:
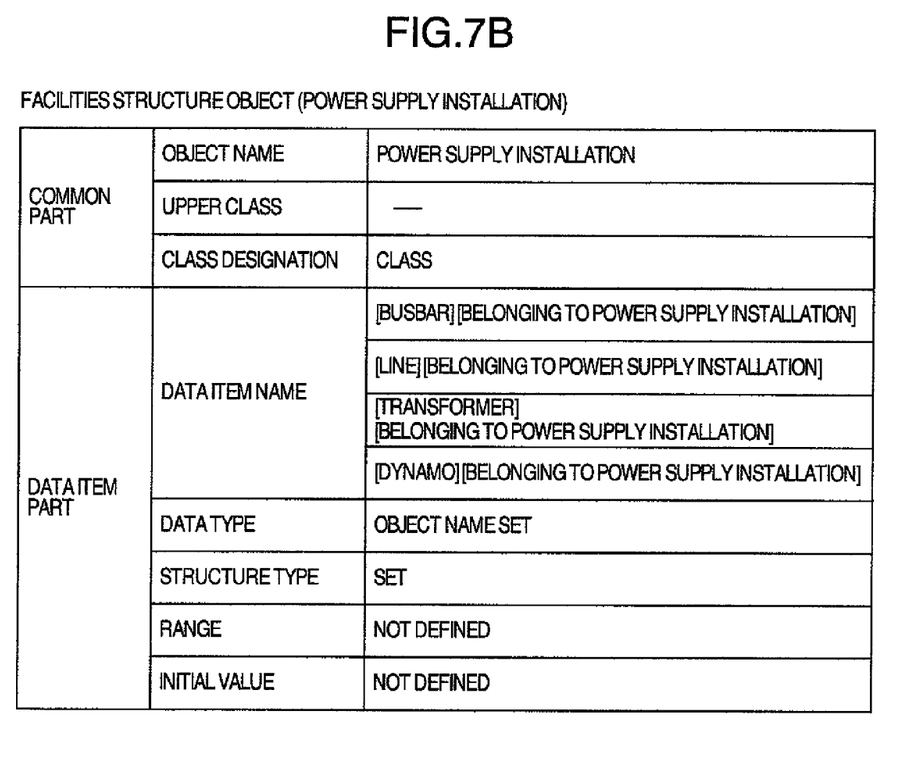

FIGS. 7A and 7B are diagrams illustrating the structures of the power supply installation in object definition tables. The object definition tables include an object definition table indicating a facilities state illustrated in FIG. 7A and an object definition table indicating a facilities structure illustrated in FIG. 7B. The object definition table has a common part for defining attributes of an object and a data item part to be managed by an object.

The common part includes an object name for identifying the object, an upper class for designating the class (group) of the object, and a glass designation for designating whether the object is handled as a class. The class is a group identifier of a plurality of object groups.

The data item part includes a data item name for identifying data, a data type for designating the type of data to be stored, a structure type meaning an array of a plurality of data sets, a range for designating values (state values) of data, and an initial value.

More specifically, as illustrated in FIG. 7A, the data item part of the facilities state of the power supply installation designates [drawing pattern], [operation state] and the like, and as illustrated in FIG. 7B, the data item part of the facilities structure of the power supply installation designates [bulbar] [belonging to power supply installation], [line] [belonging to power supply installation], [transformer] [belonging to power supply installation], and [dynamo] [belonging to power supply installation].

Figure 8A:
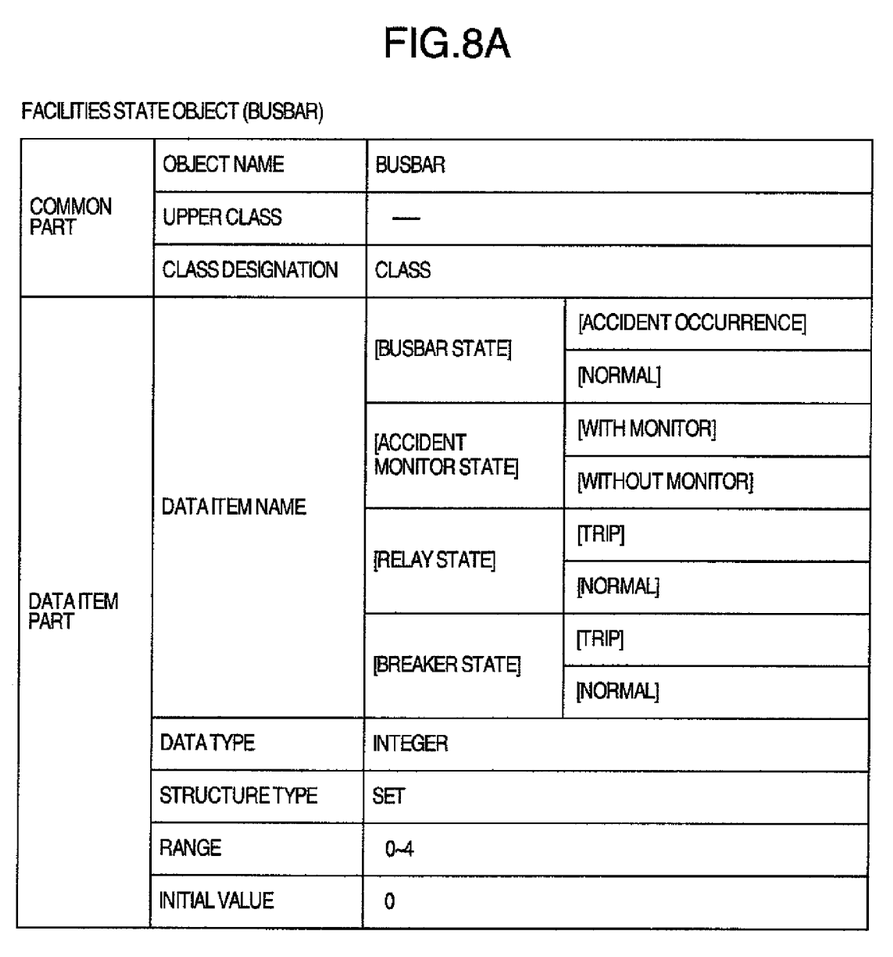
FIGS. 8A and 8B are diagrams illustrating the structures of a busbar in object definition tables.
Figure 8B:
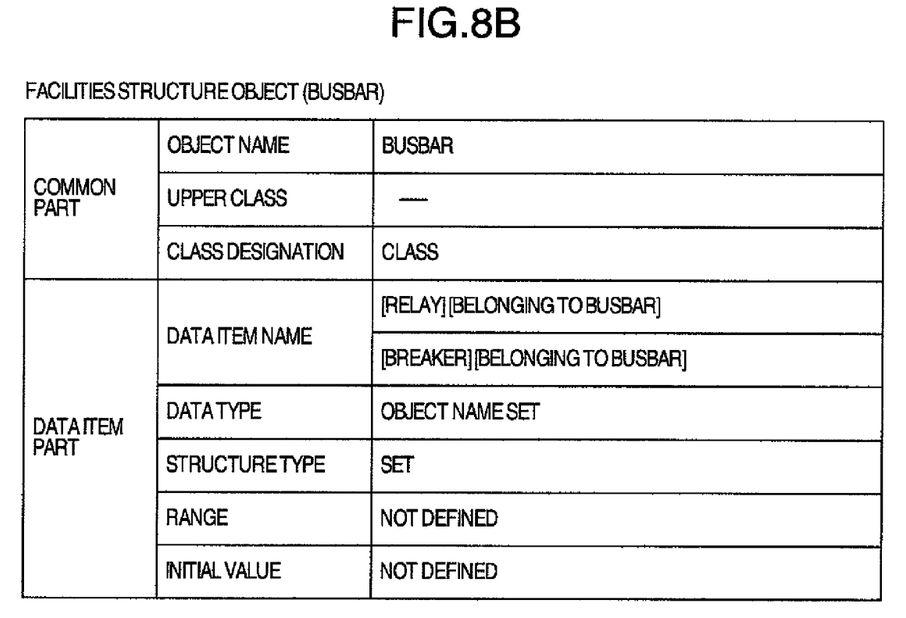

FIGS. 8A and 8B are diagrams illustrating the structures of the busbar in object definition tables. Similar to FIGS. 7A and 7B, the object definition tables include an object definition table indicating a facilities state illustrated in FIG. 8A and an object definition table indicating a facilities structure illustrated in FIG. 8B. More specifically, as shown in FIG. 8A, the data item part of the facilities state of the busbar designates [busbar state], [accident monitor state], [relay state], and [breaker state], and as illustrated in FIG. 8B, the data item part of the facilities structure of the busbar designates [relay] [belonging to busbar] and [breaker] [belonging to busbar].

Next, a process sequence will be described.

Figure 9:
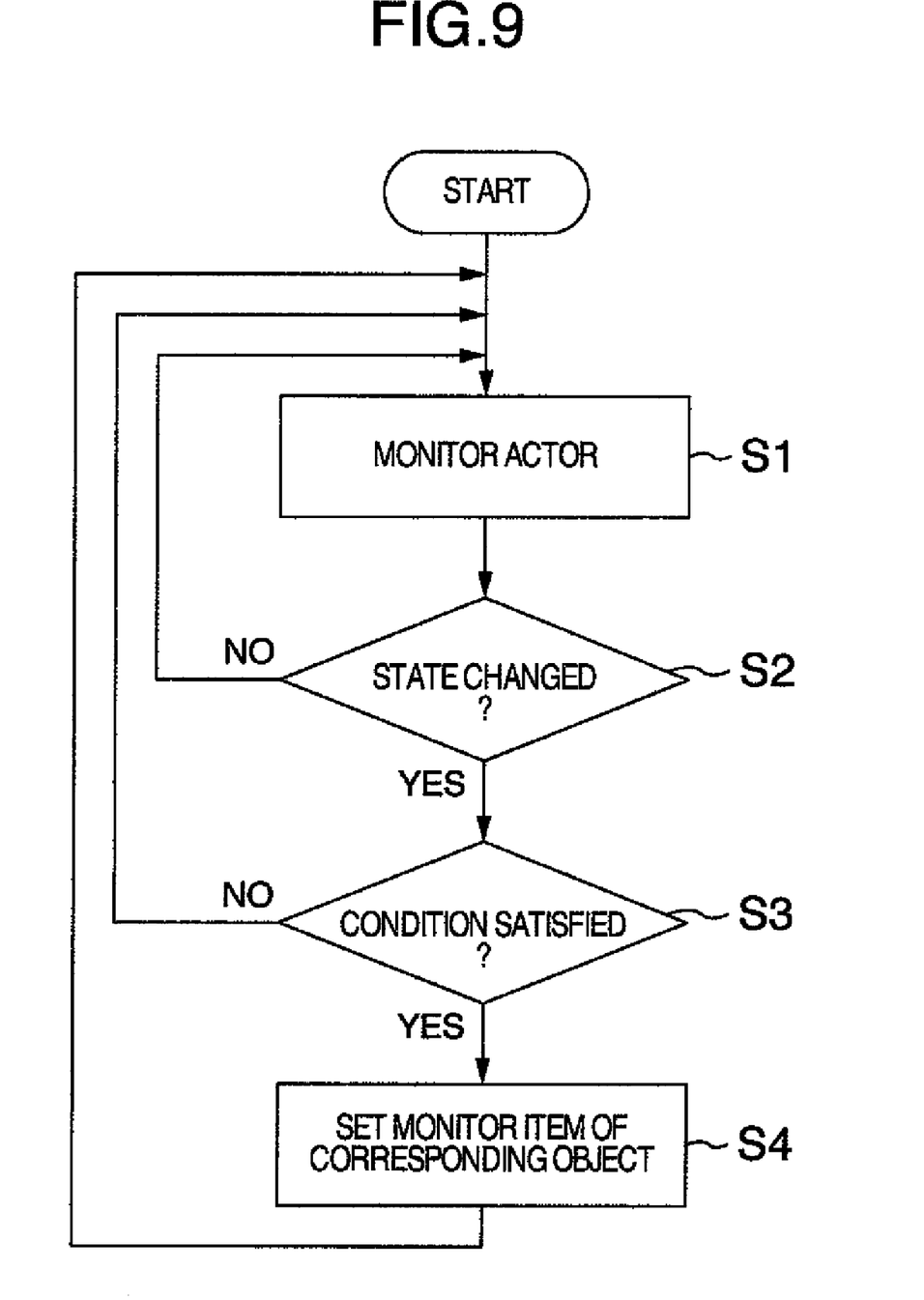
FIG. 9 is a flow chart illustrating an operation of a monitor function unit.

FIG. 9 is a flow chart illustrating the process to be executed by the monitor function unit.

The monitor function unit 15 of the processing unit 10 monitors the state of an actor set by the actor control setting unit 13. Even if a plurality of actors are registered as an actor group as illustrated in FIG. 2, each actor is basically independent and operates if "a condition is satisfied". FIG. 9 illustrates a process to be executed by each actor, as a process of the monitor function unit 15.

The monitor function unit 15 monitors the actor (Step S1). It is monitored whether a state of a condition item of the actor changes. If the state does not change (No at Step S2), the flow returns to Step S1 to continue to monitor the actor. If the state changes (Yes at Step S2), it is judged whether the condition of the actor is satisfied (Step S3). If the condition of the actor is not satisfied (No at Step S3), the flow returns to Step S1 to continue to monitor the actor. If the condition of the actor is satisfied (Yes at Step S3), a setting value of the monitor item of a corresponding object is set (step S4) to thereafter return to Step S1 to continue the process.

Figure 10:
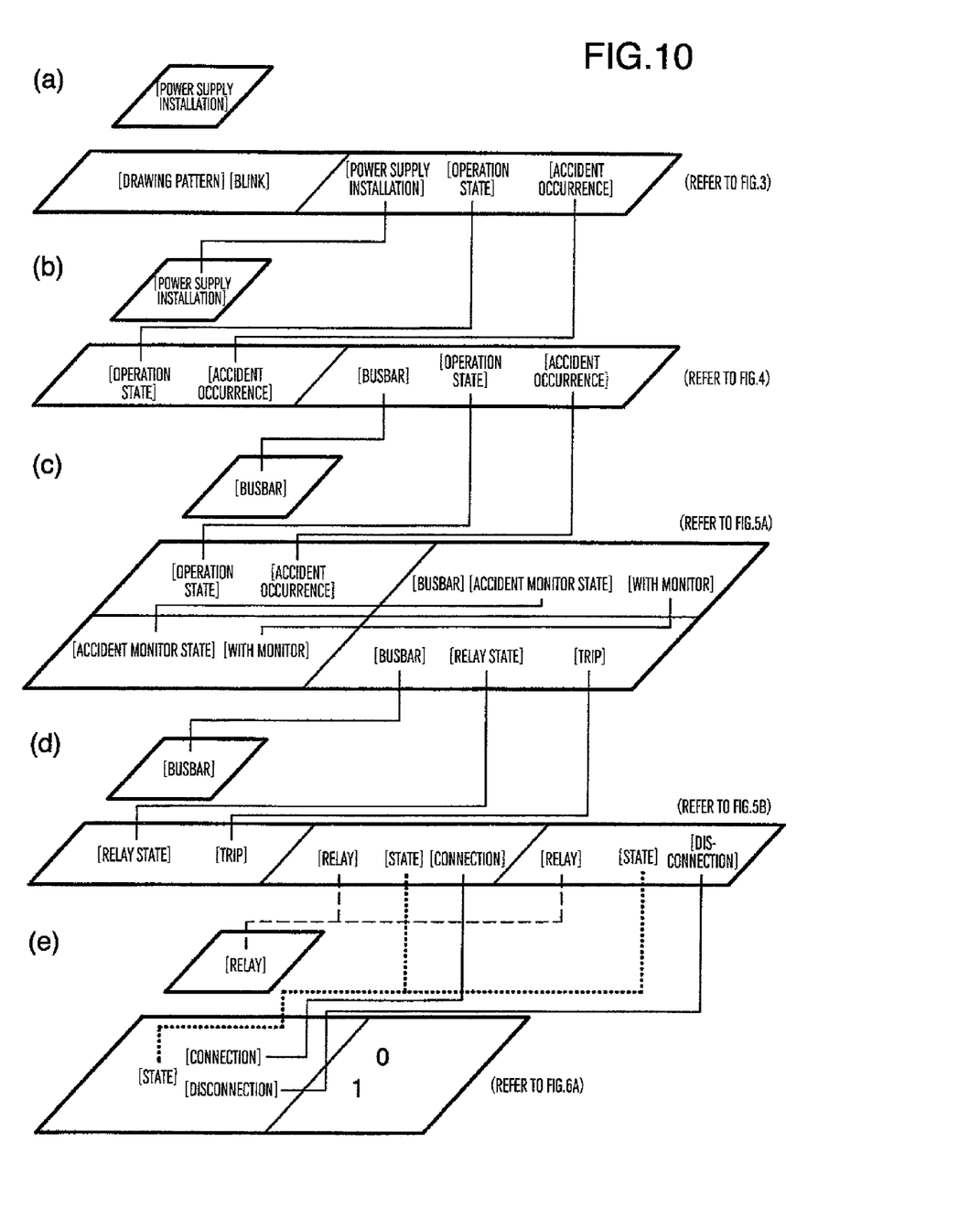
FIG. 10 is an explanatory diagram illustrating the operations of a plurality of actors.

FIG. 10 is an explanatory diagram illustrating the operations of a plurality of actors. The actor definition tables illustrated in FIGS. 3 to 6A are illustrated in rows (a) to (e) of FIG. 10. The row (a) of FIG. 10 illustrates an accident monitor function, the row (b) of FIG. 10 illustrates a power supply installation state, the rows (c) and (d) of FIG. 10 illustrate a busbar state, and the row (e) of FIG. 10 illustrates a relay state. In FIG. 10, only the definition words relevant to describing the relation among a plurality of actors are described, and other factors are shown omitted. The relation between definition words is indicated by a broken line or a solid line for the purposes of clarification.

In the process illustrated in FIG. 9, upon reception of the control signal (state value) "1" from the controlled system 200, the monitor function unit 15 sets [disconnection] to [state] of [relay] in the monitor item (object name) of the object to be controlled illustrated in the row (e) of FIG. 10. In this case, since it satisfies that the condition that the relay state illustrated in FIG. 5B is the previous connection and the present disconnection, the monitor function unit 15 sets [trip] to [relay state] of [busbar] in the monitor item (object name) illustrated in the row (d) of FIG. 10. Further, the monitor function unit 15 sets [with monitor] to [accident monitor state] of [busbar] in the monitor item (object name) illustrated in the row (c) of FIG. 10. Further, the monitor function unit 15 sets [accident occurrence] to [operation state] of [bulbar] in the monitor item (object name) illustrated in the row (c) of FIG. 10. Still further, the monitor function unit 15 sets [accident occurrence] to [accident occurrence] of [power supply installation] in the monitor item (object name) illustrated in the row (b) of FIG. 10. Next, the monitor function unit 15 sets [blink] to [drawing pattern] of [power generation/transformation] in the monitor item (object name) illustrated in the row (a) of FIG. 10. In this manner, each actor is basically independent even if a plurality of actors are registered as an actor group, and each actor sequentially operates when the condition is satisfied. Lastly, as the monitor function unit 15 sends a control signal to the control function unit 16, the control function unit 16 transmits a control signal to an object designated by the monitor function unit 15 to control the controlled system 200 via the communication control unit 33.

For example, in this embodiment, a [blink] command in [drawing pattern] illustrated in FIG. 3 may be displayed on a display screen of the output unit 32, and a control command may be transmitted to a control monitor (not shown) on a control panel of the controlled system.

In this embodiment, actors for the power supply installation can share the actor definition tables (actor definition information) illustrated in FIGS. 3 to 6B. An administrator or the like of the information control system 100 may store in advance the actor definition tables stored in the actor DB 21, in the dictionary DB 23. In this case, upon reception of a dictionary registration request for the actor definition information, the processing unit 10 stores the actor definition information already stored in the actor DB 21 in the dictionary DB 23 as a dictionary, and refers to the actor definition information in the dictionary DB 23. If the object name of an object, the monitor item of the object, and the setting value of the monitor are defined in the dictionary DB 23, the actor definition information in the dictionary DB 23 may be utilized for the process.

In this embodiment, although the actor definition table and object definition table for the power system have been described by way of example, the invention is not limited thereto. If a controlled system can be defined as actors and objects, the invention is also applicable to other information control systems such as a train running management system and a sewage/water management system.

According to the embodiment, it becomes possible to provide the information control system 100 capable of precisely defining and executing a condition for stipulating a state of an apparatus to be controlled, without using documents containing ambiguous description, for specification confirmation and requirement analysis, between an ordering party and a receiving party.

The embodiment has the following advantageous effects.

(1) Since actors capable of executing independently are used, it is possible to quickly deal with a function change and an object partial modification.

(2) An influence degree is low even if the structures of apparatus of the controlled system change.

(3) A future increase in facilities and a future increase in functions have only a small influence.

(4) Differences of hardware, operating systems (OSes) and middleware have no influence.

(5) A test environment system can be easily linked to the communication control unit.

(6) A partial test of an actor group becomes easy.

(7) Responsibility and reliability of an actor group can be verified and controlled.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control system for monitoring a state of an object constituting a controlled system and issuing a control command to said object, comprising a storage unit and a processing unit, wherein:
said storage unit stores actor definition information linking an object name of said object, a monitor item of said object, a setting value of said monitor item and a monitor condition of said setting value, as an actor serving as a control element for monitoring and controlling said object;
said processing unit receives a state value representative of the state of said object from said controlled system, and when the state of said object changes, transmits said changed state value to said actor monitoring the state of said object; and
said actor received said state value refers to said actor definition information to judge whether said monitor condition is satisfied, and if the monitor condition is satisfied, changes said setting value of said monitor item, and transmits a control command for said changed setting value to said object corresponding to said monitor item to change the state of said object in accordance with said transmitted control command, wherein:
terms corresponding to a monitor object name, a change state name and a state change name are described in said actor definition information in a definition word format; and
said processing unit refers to a definition word of an actor to be executed and a definition word of another actor in said actor definition information, and if said definition words are the same term, links said actor to be executed and said other actor to sequentially executing said plurality of actors.

2. The control system according to claim 1, wherein said processing unit organizes a plurality of actors as an actor group for each function of said object of said controlled system, and controls an execution order of said plurality of actors and data fetching timings of said object.

3. The control system according to claim 1, wherein upon reception of a dictionary registration request for said actor definition information, said processing unit stores said actor definition information already stored in said storage unit, as a dictionary, refers to said actor definition information of said dictionary, and if said object name of said object, said monitor item of said object, and said setting value of said monitor item are defined, said processing unit executes a process by using said actor definition information of said dictionary.

4. A control method for a control system for monitoring a state of an object constituting a controlled system and issuing a control command to said object, the control system comprising a storage unit and a processing unit, wherein:
said storage unit stores actor definition information storing an object name of said object, a monitor item of said object, a setting value of said monitor item and a monitor condition of said setting value, as an actor serving as a control element for monitoring and controlling said object;
said processing unit receives a state value representative of the state of said object from said controlled system, and when the state of said object changes, transmits said changed state value to said actor monitoring the state of said object; and
said actor received said state value refers to said actor definition information to judge whether said monitor condition is satisfied, and if the monitor condition is satisfied, changes said setting value of said monitor item, and transmits a control command for said changed setting value to said object corresponding to said monitor item to change the state of said object in accordance with said transmitted control command, wherein:
terms corresponding to a monitor object name, a change state name and a state change name are described in said actor definition information in a definition word format; and said processing unit refers to a definition word of an actor to be executed and a definition word of another actor in said actor definition information, and if said definition words are the same term, links said actor to be executed and said other actor to sequentially executing said plurality of actors.

5. The control method according to claim 4, wherein said processing unit organizes a plurality of actors as an actor group for each function of said object of said controlled system, and controls an execution order of said plurality of actors and data fetching timings of said object.

6. The control system according to claim 5, wherein:
terms corresponding to a monitor object name, a change state name and a state change name are described in said actor definition information in a definition word format; and
said processing unit refers to a definition word of an actor to be executed and a definition word of another actor in said actor definition information, and if said definition words are the same term, links said actor to be executed and said other actor to sequentially executing said plurality of actors.

* * * * *